United States Patent Office 3,781,297
Patented Dec. 25, 1973

---

3,781,297
PROCESS FOR PREPARING 2-AMINOBENZOTHIA-ZOLE AND ITS N-ALKYL SUBSTITUTION PRODUCTS FROM 2-MERCAPTOBENZOTHIAZOLE
Dieter Pawellek, Leverkusen, and Karlfried Wedemeyer, Cologne-Stammheim, Germany, assignors to Bayer Aktiengesellschaft, Leverkusen, Germany
No Drawing. Filed Dec. 2, 1971, Ser. No. 204,313
Claims priority, application Germany, Dec. 8, 1970, P 20 60 197.2
Int. Cl. C07d 91/46
U.S. Cl. 260—305                           6 Claims

ABSTRACT OF THE DISCLOSURE 2-aminobenzothiazole and its N-alkyl substituted products are prepared reacting 2-mercaptobenzothiazole with an amine and sulfur dioxide inthhe presence of a metal oxide, hydroxide or salt catalyst at elevated temperature and pressure.

BACKGROUND

This invention relates to a greatly improved process for the preparation of 2-aminobenzothiazole and it N-alkyl substitution products.

SUMMARY

It has been found that 2-aminobenzothiazole and its N-alkyl substitution products can be easily obtained in excellent yields and in a high degree of purity by reacting 2-mercaptobenzothiazole, if desired in the form of its salts, in an aqueous medium with at least the stoichiometrically required quantity of an amine of the following formula

wherein

R and $R_1$ which may be the same or different are hydrogen atoms or lower alkyl radicals (preferably $C_1$–$C_6$), which together may be the constituents of a 5-, 6- or 7-membered ring system, in which in the case of a 6-membered ring this may contain an oxygen or sulphur atom as an additional hetero atom or a nitrogen atom which is substituted with a lower alkyl radical (preferably $C_1$–$C_6$), and with at least the stoichiometrically required quantity of sulphur dioxide in the presence of an alkali metal, e.g. lithium, sodium, potassium or alkaline earth metal, e.g. magnesium, calcium or of a metal of the first or second sub-group of the periodic system, e.g. zinc in the form of oxides, hydroxides or the salt of acids which are weaker than sulphurous acid, the reaction being carried out at a temperature range of from 80° C. to 240° C. at elevated pressure.

DESCRIPTION

The amines used for the process according to the invention for the process according to the invention may be propylamine, butylamine, 3 - (N,N - dimethylamino)-propylamine, dimethylamine, diethylamine, pyrrolidine, piperidine, hexamethylene imine, morpholine or N-methylpiperazine, but ammonia and methylamine are particularly advantageous.

The alkali metal used may be lithium but is preferably sodium or potassium and the alkaline earth metals are preferably magnesium and the calcium. The sub-group elements of the periodic system are those of the first and second sub-group (K. A. Hoffmann and U. R. Hoffmann, Anorganische Chemie, Friedrich Vieweg u. Sohn, Braunschweig, 12th ed. (1948)), zinc salts being preferred.

Salts of acids which are weaker than sulphurous acid should be understood to mean those which have a $p_K$-value greater than 1.92. The preferred salts are those of lower aliphatic carboxylic acids (containing 1 to 4 carbon atoms, preferably acetic acid) and those of carbonic acid and of 2-mercaptobenzothiazole.

The preparation of, for example, 2-methylaminobenzothiazole by the reaction of 2-mercaptobenzothiazole and methylamine in the presence of sulphur dioxide in aqueous solution has been described for the first and only time in the literature by I. Ubaldini and A. Fiorenza (G. 76, 216 (1946); C. A., 41, 960–1 (1947)). The reaction is carried out with a molar ratio of 1:5.2:35 in a sealed thick-walled glass tube at 150° C. and the desired 2-methylaminobenzothiazole is isolated after 4 hours in a 25% yield. With a 47% conversion of 2-mercaptobenzothiazole, the yield is calculated to be 54% of the theory. When this method was re-tested by us it was found that quantitative conversion can be achieved by this method only after a reaction time of 24 hours, the unreacted 2-mercaptobenzothiazole cannot be readily isolated and re-used in the reaction. Separation from the sulphur which is also precipitated during the isolation of not reacted starting material can only be achieved by repeated re-dissolving in sodium hydroxide solution which leads to considerable loss of product. Even then the product still contains a considerable quantity (approximately 10%) of elementary sulphur. The amount of time which has to be expended, and the fact that conversion is not quantitative, make it clear that the synthesis of for example 2-methyl-amino-benzothiazole could become technically important only if substantially complete conversion of the 2-mercaptobenzothiazole were achieved and this cannot be obtained by the known method.

It must therefore be regarded as expressivly surprising that the catalysts used according to the invention enable 2-aminobenzothiazole and its N-alkyl substitution products to be easily produced on a technical scale. The process of the invention may, of course, be carried out not only with 2-mercaptobenzothiazole as starting material but also by preparing instead the alkali metal salts, the alkaline earth metal salt or the sub-group metal salt of 2-mercaptobenzothiazole in a preliminary reaction and then reacting such a salt with the above described amines or ammonia and sulphur dioxide in an aqueous medium.

The molar ratios of the reactants may be varied to a considerable extent in the process of the invention. The molar ratio of 2-mercaptobenzothiazole to sulphur dioxide should not be higher than 1. An excess of sulphur dioxide in no way impairs the ease with which the process can be carried out. Preferably, 2 mols of sulphur dioxide are used per mol of 2-mercaptobenzothiazole.

The ratio of 2-mercaptobenzothiazole to amine should also not be higher than 1. The ratio preferably chosen is 1:4. An excess of amine has no disadvantageous influence on the process. The catalysts for use according to the invention may be present in a molar ratio of 1.75–2.5:1, preferably 2:1, based on the amount of sulphur dioxide present. Because the catalysts are salts of which the anion is related to an acid weaker than sulphurous acid, or compounds which react with sulphur dioxide, the hydrogen sulphite of alkali metal, alkaline earth metal or sub-group metal will be produced of course in the reaction mixture. It should be present in at least equimolar quantities, based on the amount of 2-mercaptobenzothiazole used.

The reaction may be carried out at the autogenous pressure corresponding to the reaction temperature or at elevated pressures in the region of 1 to 50 excess atmospheres, preferably 5 to 12 excess atmospheres and particularly 7 to 9 excess atmospheres. The reaction temperatures may vary within a wide range. Temperatures of between 80° C. and 240° C., preferably between 160° C. and 180° C., are generally employed.

Whereas it is explicitly stated in the publication referred to above that a reaction of 2-mercaptobenzothiazole with secondaary amines does not take place, it has surprisingly been found that in the process according to the invention even secondary amines can be reacted.

Working up of the reaction mixtures is carried out by the conventional methods.

The benzothiazoles obtainable by the process, which have an amine function in the 2-position, serve as intermediate products for the production of plant-protective agents and may also be used directly as such.

The temperatures quoted in the following examples are given in degrees centigrade.

EXAMPLE 1 (FOR COMPARISON)

83.5 g. (0.5 mol) of 2-mercaptobenzothiazole (M.P.: 173–178°) and 62 g. (2.0 mols) of methylamine in 206 g.=222 ml. of a 30% by weight aqueous solution into which 64 g. (1 mol) of sulphur dioxide have been introduced are reacted in a stainless steel autoclave of 700 ml. capacity equipped with stirrer at a temperature of 160° and a pressure of 7–9 excess atmospheres. The effect of varying the reaction time on the yield of 2-methylaminobenzothiazole (M.P.: 136–137°) is summarised in Table 1. The percentages refer to the amount of 2-mercaptobenzothiazole put into the process.

TABLE 1

| Experiment number | Reaction time, hours | 2-methylaminobenzothiazole | |
|---|---|---|---|
| | | Grams | Percent |
| 1 | 1 | 26 | 32 |
| 2 | 2 | 32 | 39 |
| 3 | 3 | 43 | 52 |
| 4 | 4 | 50 | 61 |
| 5 | 5 | 49 | 60 |
| 6 | 6 | 56 | 68 |
| 7 | 10 | 65 | 80 |
| 8 | 24 | 75 | 91 |

EXAMPLE 2

83.5 g. (0.5 mol) of 2-mercaptobenzothiazole, if desired with the addition of equimolar quantities of oxides, hyroxides or salts of acids weaker than sulphurous acid of alkali metals, alkaline earth metals or sub-group metals dissolved or suspended in 130 ml. of water, and 62 g. (2 mols) of methylamine contained in 206 g.=222 ml. of a 30% aqueous solution into which 64 g. (1 mol) of sulphur dioxide have been introduced are reacted in a stainless steel autoclave of 700 ml. capacity equipped with stirrer at a temperature of 160° C. and a pressure of 7–9 excess atmospheres for 3.5 hours. The influence of the addition of salt on the yield of 2-methylaminobenzothiazole compared with the yield obtained in an experiment carried out without salt is summarized in Table 2.

TABLE 2

| Experiment number | Addition of salt | | | Yield | |
|---|---|---|---|---|---|
| | Grams | Mol | Type | Grams | Percent |
| 1 | 0 | 0 | | 49 | 60 |
| 2 | 12 | 0.5 | Lithium hydroxide | 70 | 85 |
| 3 | 20 | 0.5 | Sodium hydroxide | 75 | 92 |
| 4 | 41 | 0.5 | Sodium acetate | 76 | 93 |
| 5 | 27 | 0.25 | Sodium carbonate | 76 | 93 |
| 6 | 28 | 0.5 | Potassium hydroxide | 74 | 90 |
| 7 | 10 | 0.25 | Magnesium oxide | 60 | 73 |
| 8 | 19 | 0.25 | Calcium hydroxide | 65 | 79 |
| 9 | 83 | 0.25 | Bis-mercaptobenzothiazolyl zinc salt | 71 | 86 |

EXAMPLE 3

94.5 g. (0.5 mol) of the sodium salt of 2-mercaptobenzothiazole contained in 153 ml. of a 43% by weight aqueous solution, and 62 g. (2 mols) of methylamine contained in 206 g.=222 ml. of a 30% by weight aqueous solution into which 64 g. (1 mol) of sulphur dioxide have been introduced are stirred for 3 hours in a stainless steel autoclave of 700 ml. capacity equipped with stirrer, at a temperature of 160° and a pressure of 7–9 excess atmospheres. After cooling to room temperature, the pressure in the autoclave is released (residual pressure less than 1 excess atmosphere) and the reaction mixture is removed by suction. The crude 2-methylaminobenzothiazole which is present as a solid constituent is washed with hot 20% aqueous sodium hydroxide solution and with cold water, the dark-colored crude product being purified to give a beige-colored product. 78–80 g.=95–98% of the theory of 2-methylaminobenzothiazole (M.P.: 137–139°), based on the amount of 2-mercaptobenzothiazole put into the process, are obtained.

EXAMPLE 4

The continuous production of 2-methylaminobenzothiazole by reacting 40–50% by weight aqueous solutions of 2-mercaptobenzothiazole in the form of its sodium salt and methylamine in the form of a 30% by weight aqueous solution in the presence of sulphur dioxide in the molar ratio of 1:4:2 is carried out in three laboratory pressure vessels connected in series. These vessels are equipped with mechanical stirrers and are free from packing glands. They are products of the engineering company SFS, Zurich, Switzerland. (These pieces of apparatus have double-walled, heatable glass pressure containers 900 ml. in capacity which are designed for a pressure of 12 excess atmospheres at 200° C.; internal diameter 8.0 cm.; length of stirrer blade 5.0 cm.; annular flow breaker; stirrer free from packing glands and operated by magnetic coupling; infinitely variable differential gearing.) The solutions are fed into the apparatus by means of a separately controlled two-headed pump. The effects of varying the temperature and residence time on the conversion and yield is summarized in Table 3.

TABLE 3

| Experiment number | Time of stay, hours | Reaction temperature, ° C. | Duration, hours[1] | Percent | |
|---|---|---|---|---|---|
| | | | | Conversion | Yield |
| 1 | 3.5 | 160 | 10 | 89 | 89 |
| 2 | 3.5 | 165 | 12 | 92 | 92 |
| 3 | 4.5 | 160 | 10 | 95 | 95 |
| 4 | 4.5 | 170 | 10 | 95 | 95 |
| 5 | 4.5 | 180 | 10 | 94 | 94 |
| 6 | 6.0 | 165 | 4 | 94 | 94 |
| 7 | 7.0 | 165 | 6 | 96 | 96 |

[1] After adjustment of the equilibrium for 10 hours, adjustment of the equilibrium being determined by a time/conversion curve under intermittent operation.

EXAMPLE 5

83.5 g. (0.5 mol) of the sodium salt of 2-mercaptobenzothiazole in 153 ml. of a 43% by weight aqueous solution are reacted with 2 mols of a secondary amine in the presence of 64 g. (1 mol) of sulphur dioxide at 160° C. for 3 hours in a stainless steel autoclave of 700 ml. capacity equipped with stirrer. The nature of the secondary amine, the yield of 2-dialkylamino-benzothiazole and the result of analysis of the compounds, which are all new with the exception of the dimethyl compound, are summarized in Table 4.

TABLE 4

| Experiment number | Secondary amine | Yield | | | M.P., °C. | Molecular formula | Molecular weight | Calculated, percent | | | | Found, percent | | | |
|---|---|---|---|---|---|---|---|---|---|---|---|---|---|---|---|
| | | Grams | Grams | Percent | | | | C | H | N | S | C | H | N | S |
| 1 | Dimethylamine | 90 | 54 | 61 | 85-87 | $C_9H_{10}N_2S$ | 178 | 60.6 | 5.6 | 15.7 | 17.9 | 60.1 | 5.7 | 15.6 | 17.8 |
| 2 | Diethylamine | 146 | 4 | 4 | 82-86 | $C_{11}H_{14}N_2S$ | 206 | 64.1 | 6.8 | 13.6 | 15.5 | 63.7 | 6.4 | 14.1 | 15.8 |
| 3 | Pyrrolidine | 142 | 30 | 29 | 89-91 | $C_{11}H_{12}N_2S$ | 204 | 64.7 | 5.9 | 13.7 | 15.7 | 64.5 | 5.9 | 13.7 | 15.9 |
| 4 | Piperidine | 170 | 24 | 22 | 84-88 | $C_{12}H_{14}N_2S$ | 218 | 66.0 | 6.4 | 12.8 | 14.7 | 65.7 | 6.3 | 12.7 | 15.3 |
| 5 | Hexamethylene imine | 188 | 14 | 12 | 123-128 | $C_{13}H_{16}N_2S$ | 232 | 67.2 | 6.9 | 12.1 | 13.8 | 68.1 | 7.1 | 11.0 | 13.8 |
| 6 | Morpholine | 174 | 52 | 47 | 123 | $C_{11}H_{12}N_2OS$ | 220 | 60.0 | 5.4 | 12.7 | 14.5 | 60.4 | 5.8 | 12.8 | 14.0 |
| 7 | N-methylpiperazine | 200 | 22 | 19 | 81-84 | $C_{12}H_{15}N_3S$ | 233 | 61.8 | 6.4 | 18.0 | 13.7 | 61.7 | 6.6 | 18.3 | 13.6 |

EXAMPLE 6

83.5 g. (0.5 mol) of 2-mercaptobenzothiazole (HMBT) suspended in 130 ml. of water or 94.5 g. (0.5 mol) of its sodium salt contained in 153 ml. of a 43% by weight aqueous solution, and 68 g. (4 mols) of ammonia contained in 276 g.=302 ml. of a 22.5% by weight aqueous solution into which 64 g. (1 mol) of sulphur dioxide have been introduced are stirred for 3 hours and 6 hours, respectively, in a stainless steel autoclave of 700 ml. capacity equipped with stirred, at a temperature of 160° C. and a pressure of 9–13 excess atmospheres. After cooling to room temperature, the residual pressure (less than 1 excess atmosphere) is released and the reaction mixture is removed by suction. The crude 2-aminobenzothiazole obtained as solid constituent is washed with hot 20% sodium hydroxide solution and with cold water, the dark-colored crude product being purified to give a beige product (M.P.: 125–128°). The effect of the presence of the alkali metal and of varying the reaction time on the yield is summarized in Table 5.

TABLE 5

| Experiment number | Starting material | Reaction time, hours | 2-aminobenzothiazole | |
|---|---|---|---|---|
| | | | Grams | Percent |
| 1 | HMBT | 3 | 42 | 50 |
| 2 | NaMBT | 3 | 54 | 72 |
| 3 | HMBT | 6 | 56 | 73 |
| 4 | NaMBT | 6 | 64 | 85 |

What is claimed is:

1. Process for preparing 2-aminobenzothiazole and its N-alkyl substitution products which comprises reacting 2-mercaptobenzothiazole in an aqueous medium with at least the stoichiometrically required quantity of a compound selected from the group consisting of ammonia, pyrolidine, piperidine, hexamethylene imine, morpholine, N-methylpiperazine and amines of the formula

wherein

R is $C_{1-6}$ alkyl and $R_1$ is hydrogen or $C_{1-6}$ alkyl, and with at least the stoichiometrically required quantity of sulphur dioxide in the presence of a catalyst selected from the group of an alkali metal, alkaline earth metal, and a metal of the first or second sub-group of the periodic system in the form of its oxides, hydroxides or salt of acids which are weaker than sulphurous acid, in the temperature range of 80° C. to 240° C. at elevated pressure.

2. Process of claim 1 wherein ammonia or methylamine is used.

3. Process of claim 1 wherein the salts of acids which are weaker than sulphurous acid are salts of lower aliphatic carboxylic acids which have 1 to 4 carbon atoms, carbonic acid or 2-mercaptobenzothiazole.

4. Process of claim 1 carried out at 5 to 12 excess atmospheres.

5. Process of claim 1 carried out at 160 to 180° C.

6. Process of claim 1 carried out continuously.

References Cited

Ubaldin et al.: Chemical Abstracts, 41:960–1 (1947).

RICHARD J. GALLAGHER, Primary Examiner

U.S. Cl. X.R.

260—247.1, 268 BC, 293.57